(12) United States Patent
Matsunaga et al.

(10) Patent No.: US 11,187,681 B2
(45) Date of Patent: Nov. 30, 2021

(54) METHOD FOR EVALUATING STATE OF MEMBER

(71) Applicant: NUCLEAR FUEL INDUSTRIES, LIMITED, Tokyo (JP)

(72) Inventors: Takashi Matsunaga, Sennan-gun (JP); Ryota Ogawa, Sennan-gun (JP); Mitsuyuki Sagisaka, Sennan-gun (JP); Yoshihiro Isobe, Sennan-gun (JP)

(73) Assignee: NUCLEAR FUEL INDUSTRIES, LIMITED, Tokyo (JP)

( * ) Notice: Subject to any disclaimer, the term of this patent is extended or adjusted under 35 U.S.C. 154(b) by 631 days.

(21) Appl. No.: 15/533,620

(22) PCT Filed: Feb. 24, 2015

(86) PCT No.: PCT/JP2015/055273
§ 371 (c)(1),
(2) Date: Jun. 6, 2017

(87) PCT Pub. No.: WO2016/092869
PCT Pub. Date: Jun. 16, 2016

(65) Prior Publication Data
US 2017/0343516 A1 Nov. 30, 2017

(30) Foreign Application Priority Data
Dec. 10, 2014 (JP) .............................. JP2014-250151

(51) Int. Cl.
*G01N 29/44* (2006.01)
*G01N 29/04* (2006.01)
(Continued)

(52) U.S. Cl.
CPC .......... *G01N 29/4418* (2013.01); *G01H 1/00* (2013.01); *G01H 13/00* (2013.01); *G01N 29/04* (2013.01);
(Continued)

(58) Field of Classification Search
None
See application file for complete search history.

(56) References Cited

U.S. PATENT DOCUMENTS 5,068,800 A * 11/1991 Brook .................... G01N 29/12
702/36
5,327,358 A * 7/1994 Stubbs ................... G01H 17/00
702/36
(Continued)

FOREIGN PATENT DOCUMENTS

| DE | 10065314 B4 * | 8/2007 | ............. G01H 1/006 |
| JP | 11-101726 A | 4/1999 | |

(Continued)

OTHER PUBLICATIONS

International Preliminary Report on Patentability issued in PCT/JP2015/055273 (PCT/IPEA/409), dated Dec. 5, 2016.
(Continued)

*Primary Examiner* — Brent A. Fairbanks
(74) *Attorney, Agent, or Firm* — Birch, Stewart, Kolasch & Birch, LLP

(57) ABSTRACT

Provided is a member state evaluation method that makes more highly accurate instantaneous understanding of various states of a member to be tested possible without reliance on the shape of the member, the testing environment, or the skill level of the tester. The member state evaluation method is provided with: a state evaluation database construction step for constructing a state evaluation database by determining a plurality of vibration points and measurement points for each analysis model, carrying out vibration at the vibration points, measuring the acoustic signal generated by the vibration at the measurement points, carrying out frequency analysis, and thereby obtaining, as state evaluation data, frequency distribution data acquired for each vibration point and each measurement point that includes the natural
(Continued)

frequencies for each of a plurality of modes; an actual measurement state evaluation data acquisition step for acquiring, as actual measurement state evaluation data, frequency distribution data for the member to be tested that includes the natural frequencies of each of the plurality of modes; and a state evaluation step for evaluating the member to be tested by comparing the acquired actual measurement state evaluation data and all the state evaluation data of the state evaluation database.

5 Claims, 15 Drawing Sheets

(51) Int. Cl.
  *G01H 1/00* (2006.01)
  *G01H 13/00* (2006.01)
  *G01N 29/12* (2006.01)
(52) U.S. Cl.
  CPC .......... *G01N 29/045* (2013.01); *G01N 29/12* (2013.01); *G01N 29/4436* (2013.01); *G01N 29/4472* (2013.01); *G01N 2291/014* (2013.01); *G01N 2291/0258* (2013.01)

(56) References Cited

U.S. PATENT DOCUMENTS

| | | | | |
|---|---|---|---|---|
| 2003/0185436 | A1* | 10/2003 | Smith | G06K 9/6232 382/159 |
| 2014/0260526 | A1 | 9/2014 | Tsutsui et al. | |
| 2014/0324739 | A1* | 10/2014 | Claussen | G06N 20/00 706/12 |

FOREIGN PATENT DOCUMENTS

| | | |
|---|---|---|
| JP | 2000-19054 A | 1/2000 |
| JP | 2003-240764 A | 8/2003 |
| JP | 2004-325224 A | 11/2004 |
| JP | 2008-256474 A | 10/2008 |
| JP | 2014-178220 A | 9/2014 |

OTHER PUBLICATIONS

International Search Report issued in PCT/JP2015/055273 (PCT/ISA/210), dated May 19, 2015.
Written Opinion of the International Searching Authority issued in PCT/JP2015/055273 (PCT/ISA/237), dated May 19, 2015.

* cited by examiner

[FIG.1]
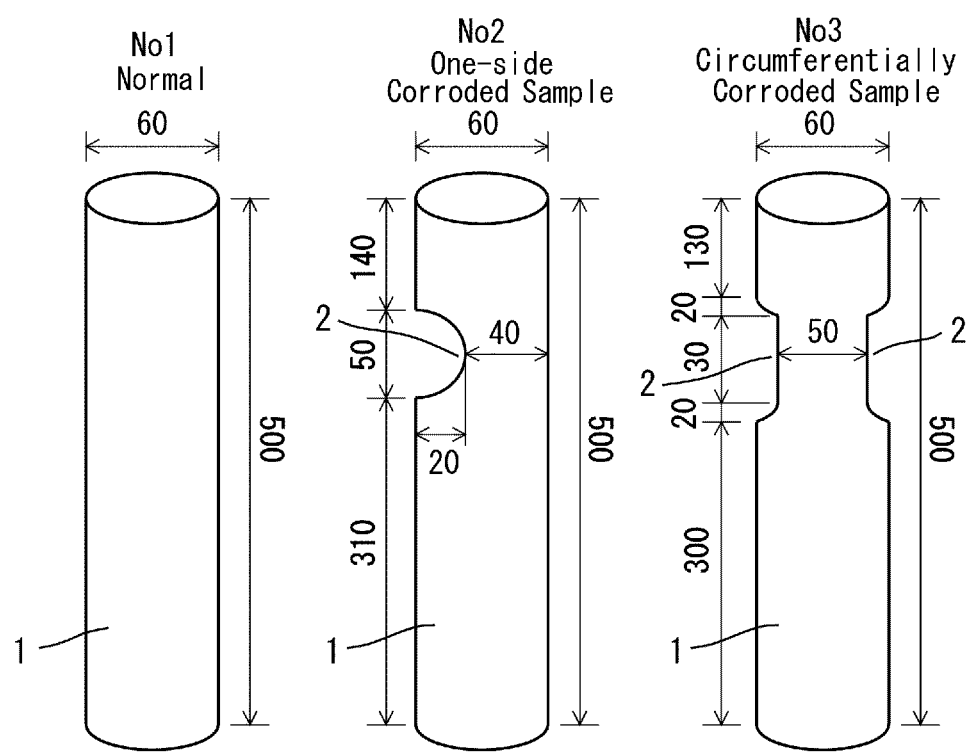

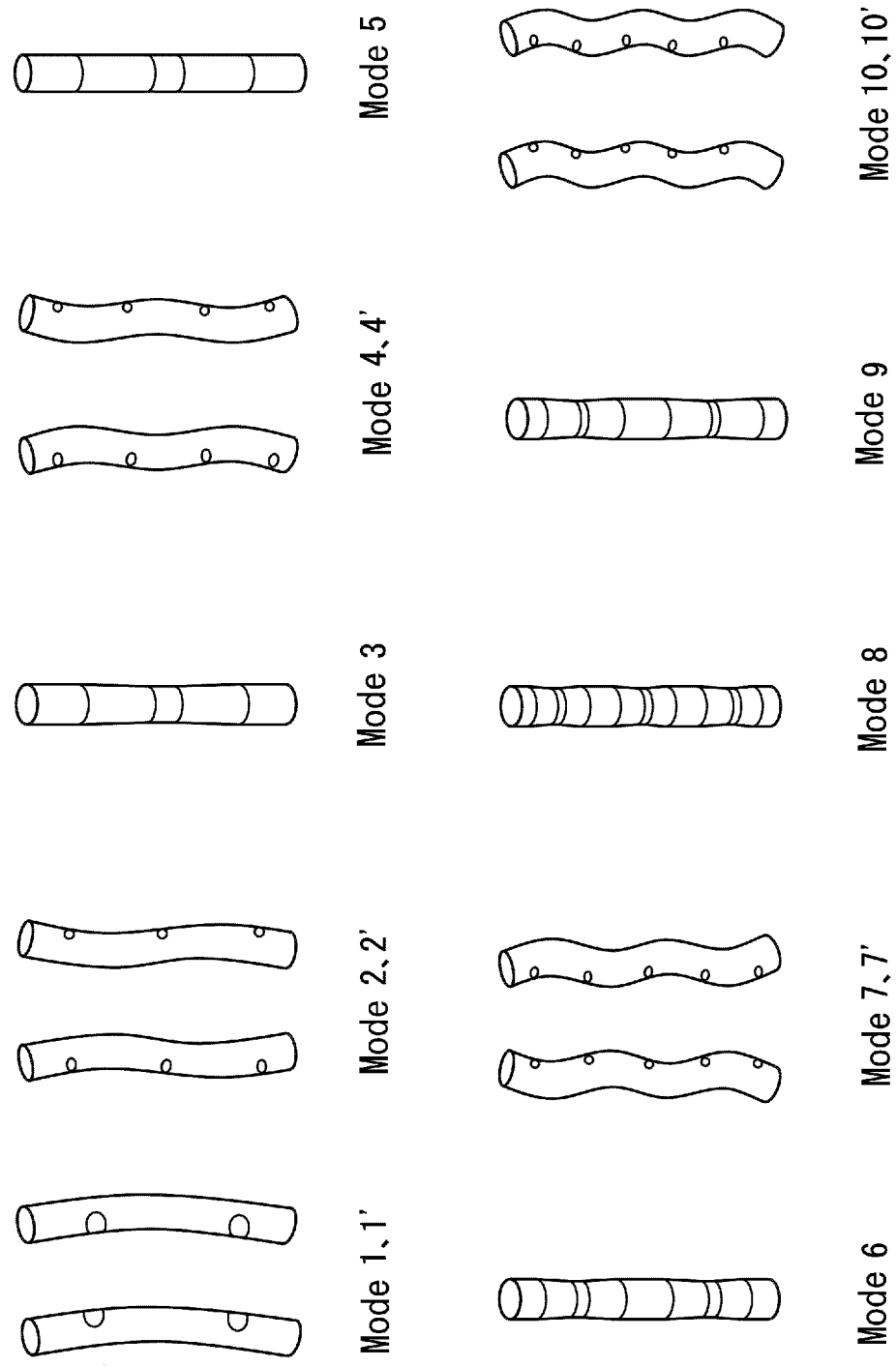
[FIG.2]

[FIG.3]
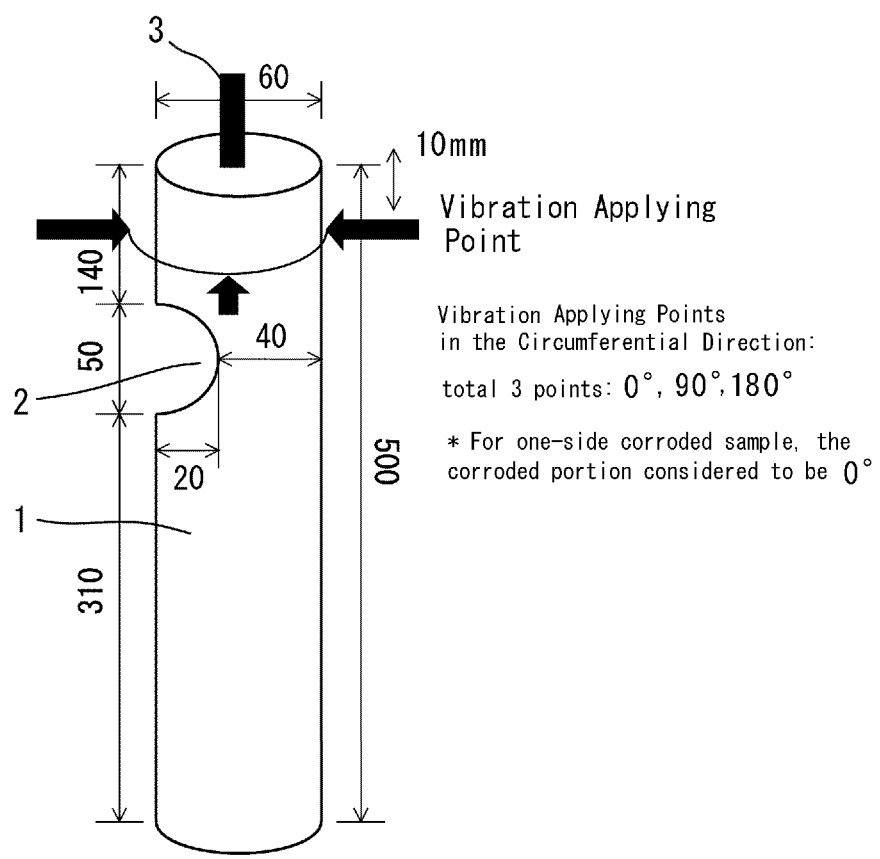

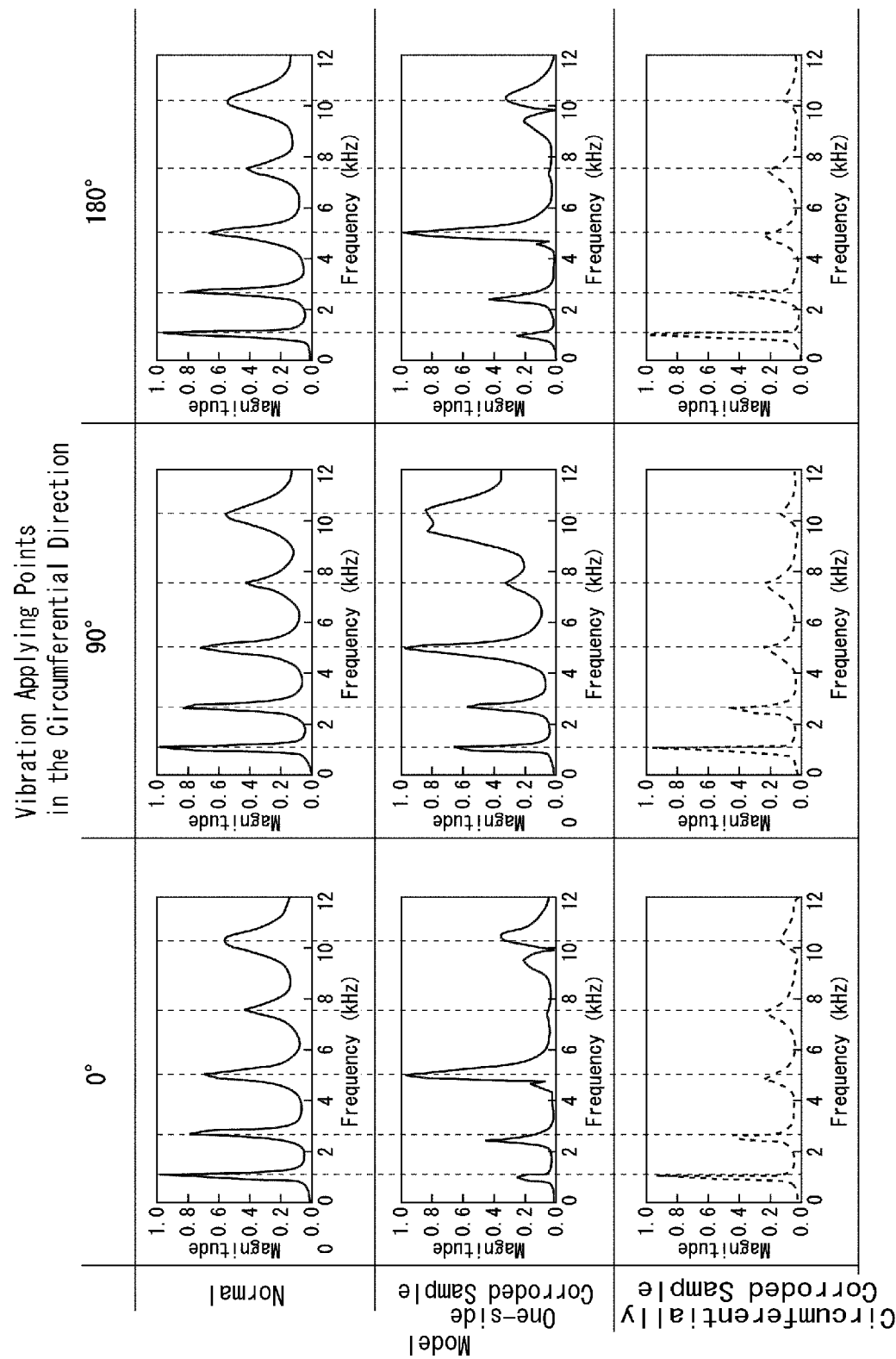
[FIG.4]

[FIG.5]
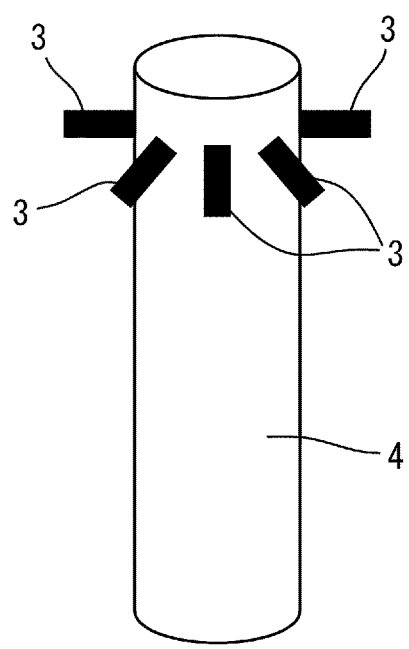

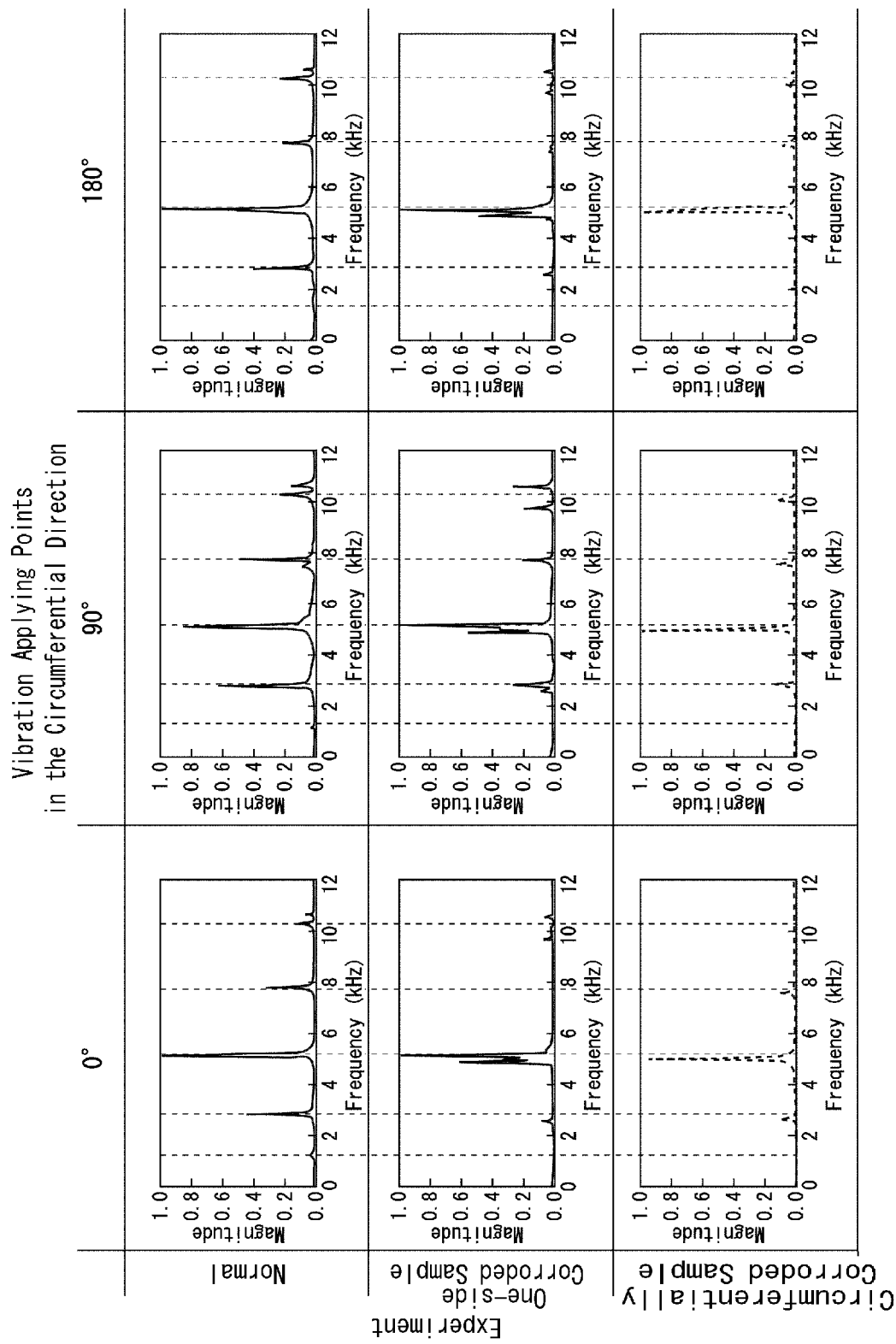
[FIG.6]

[FIG.7]
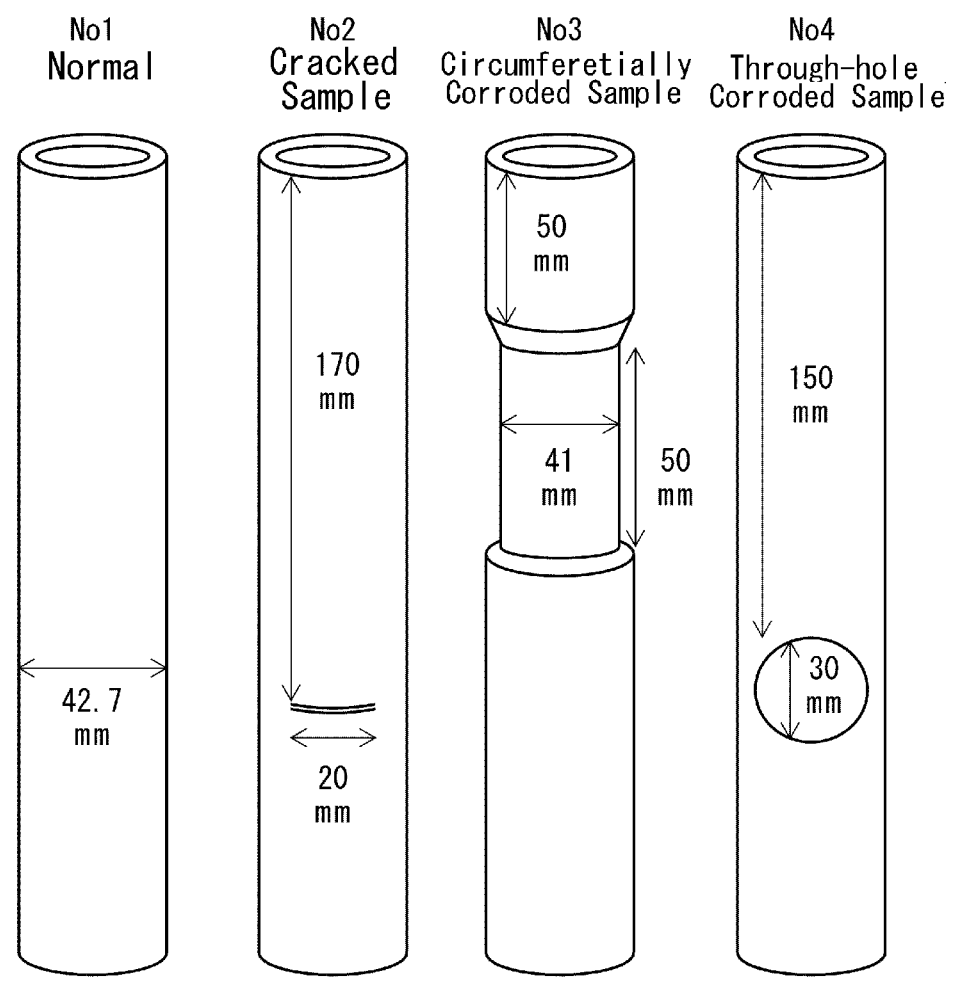

[FIG.8]
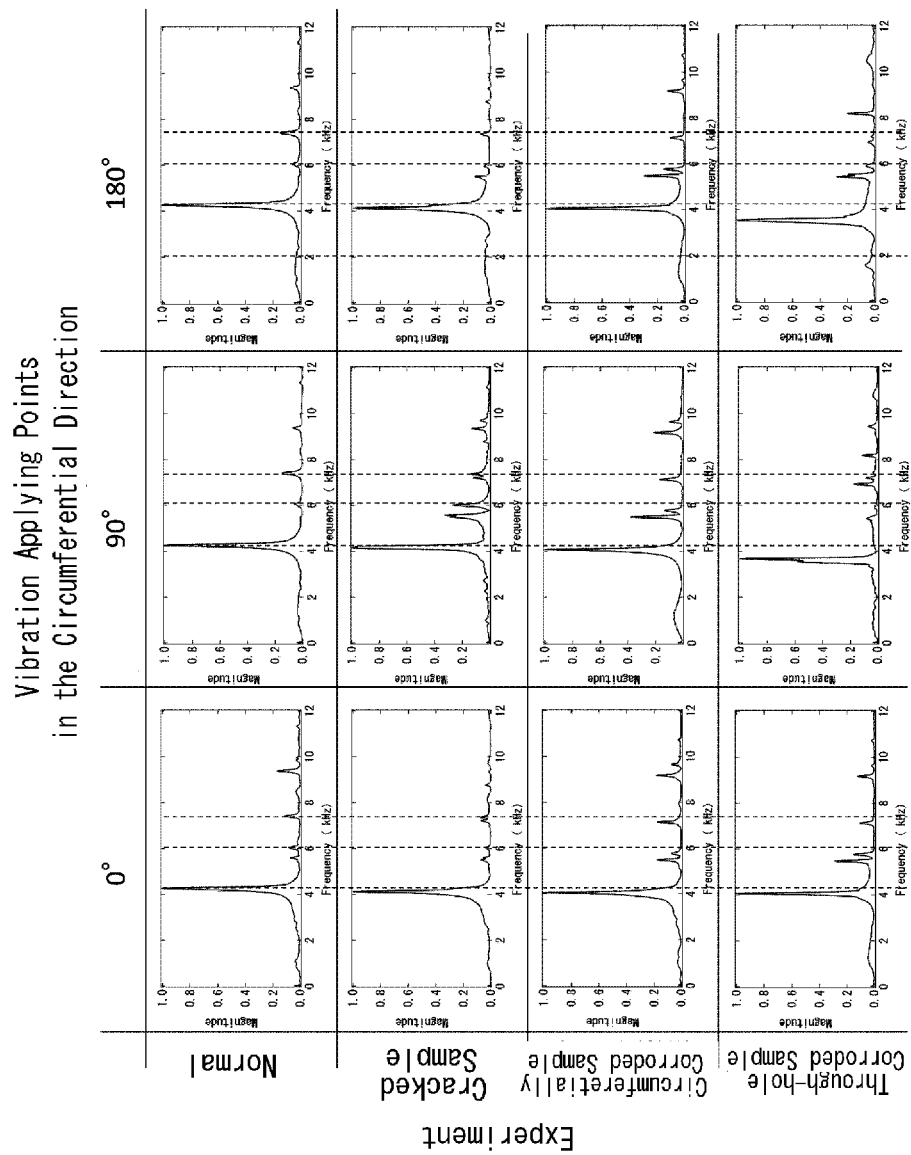

[FIG.9]
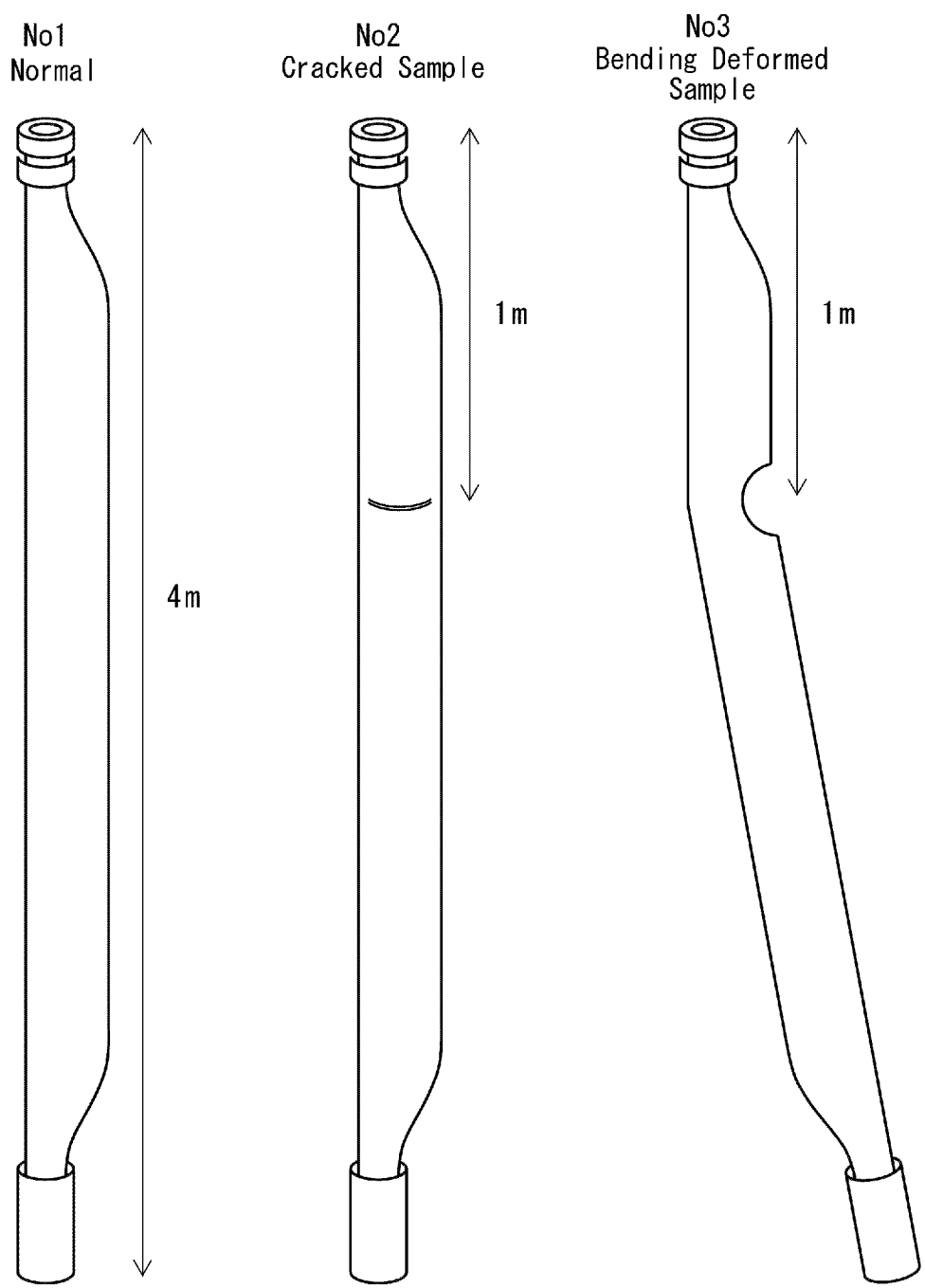

[FIG.10]
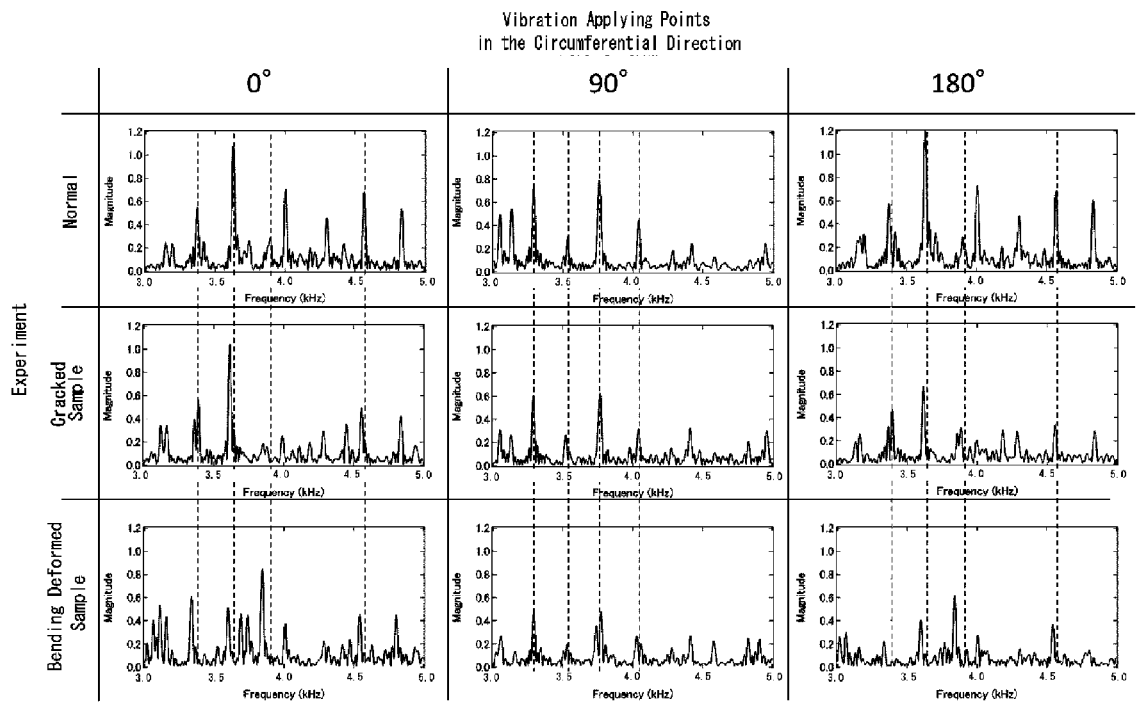
[FIG.11]
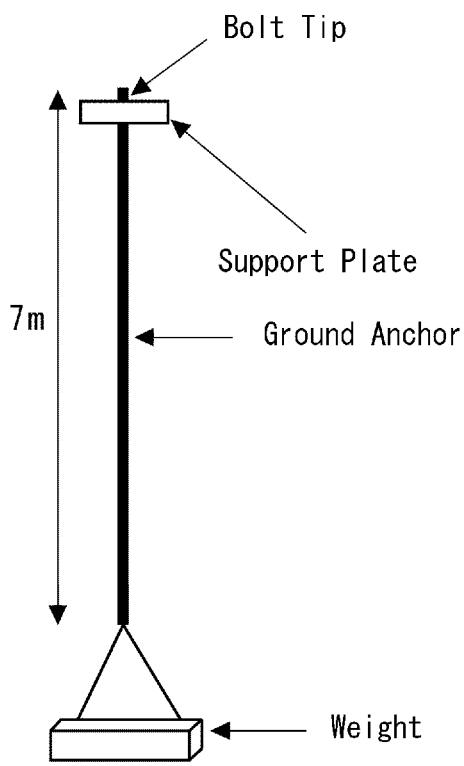

[FIG.12]
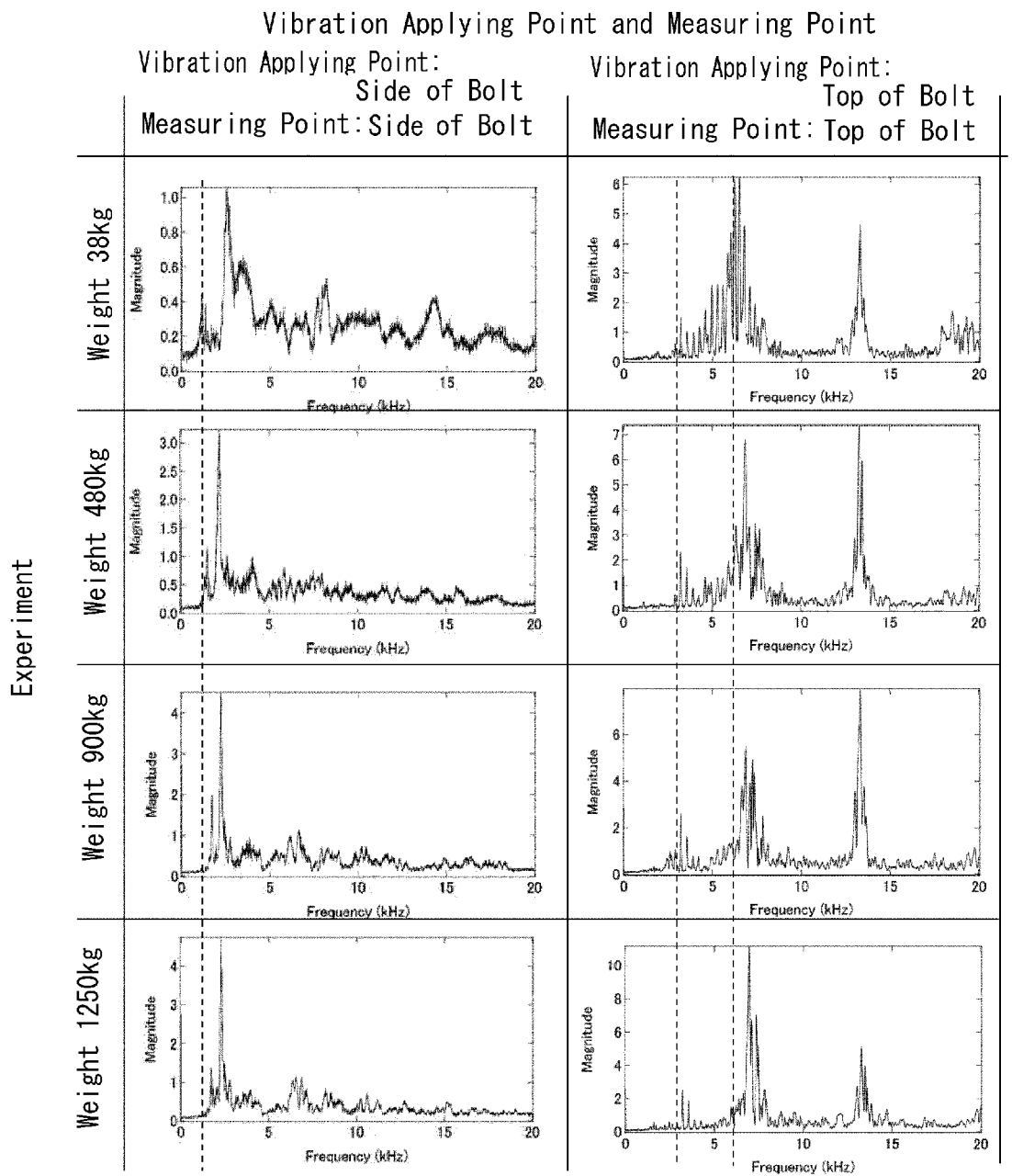

[FIG.13]
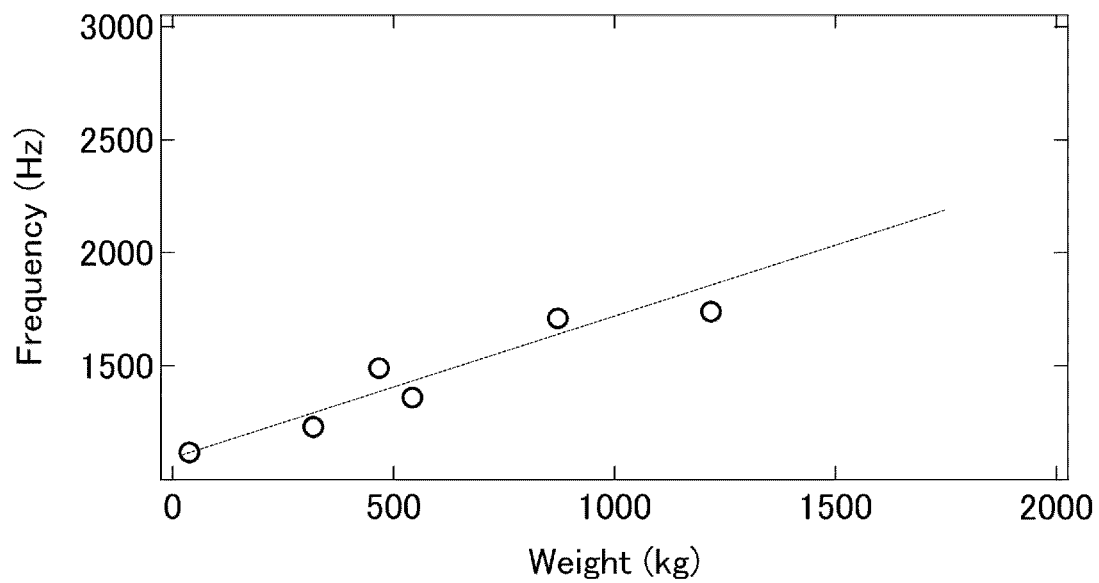
[FIG.14]
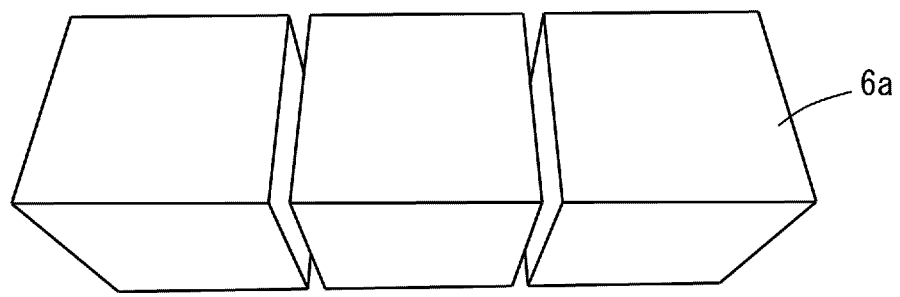

[FIG.15]
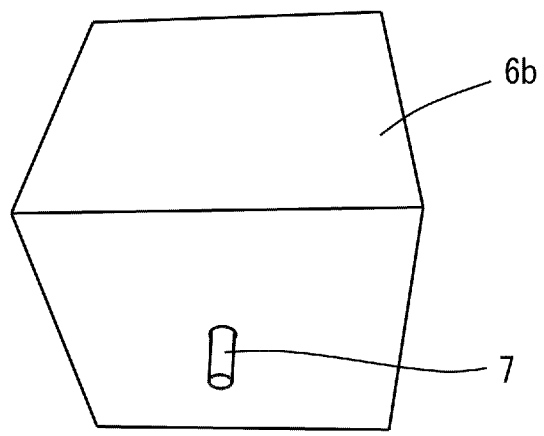
[FIG.16]
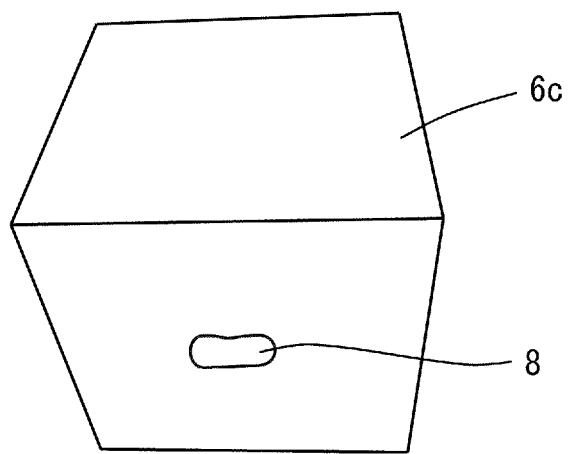

[FIG.17]
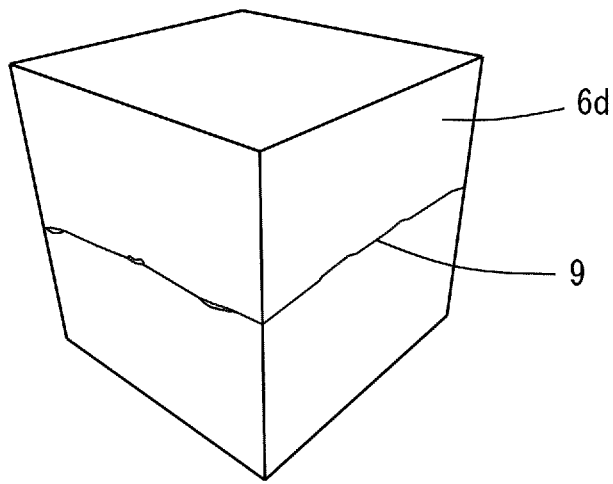
[FIG.18]
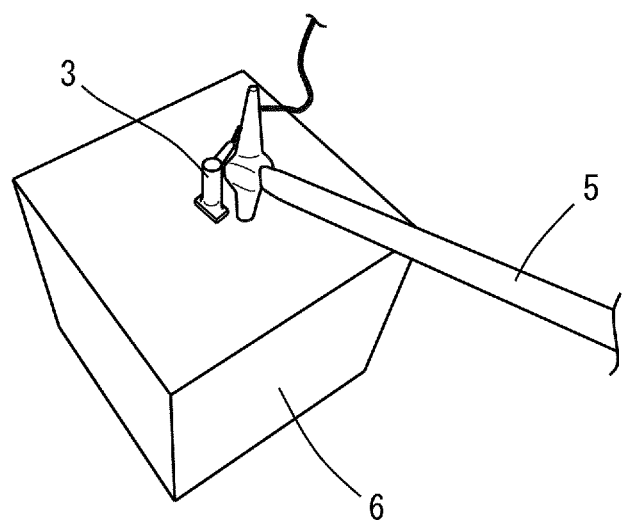

[FIG.19]
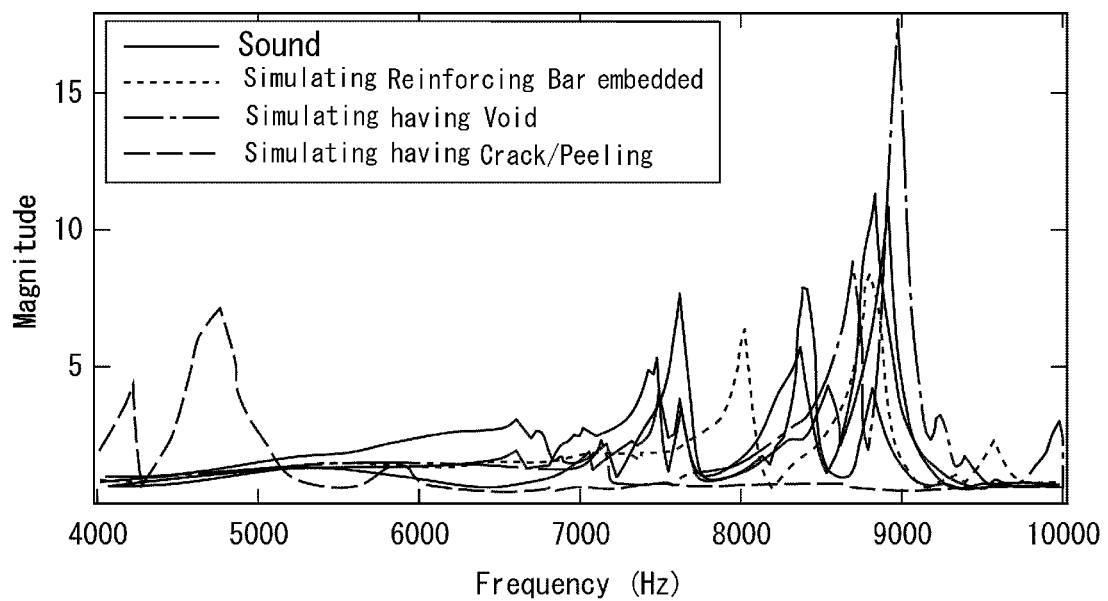

METHOD FOR EVALUATING STATE OF MEMBER

TECHNICAL FIELD

The present invention relates to a method for evaluating state of member for quantitatively grasping and evaluating state of a member, of which visual inspection of appearance is difficult, in a non-destructive manner.

BACKGROUND ART

Generally, it is difficult to visually inspect appearances of pipes, bars, boards, wires, chains or the like formed by metal, ceramics, resin, or combinations thereof, once they are installed or assembled. Specifically, it is difficult to visually inspect steel frames, reinforcing bars, steel pipes (members used for civil engineering facilities, constructions, steel towers, scaffoldings, bracings, guardrails, fences or other structures), piping, shafts of instruments (such as pumps and cars), anchor bolts (adhesive anchors, metal anchors, foundation bolts), lock bolts (twisted steel bars, deformed steel bars, all-screw steel bars, steel pipe expansion types and the like), tendon/tension members (for example, PC steel wires, PC steel wire strands, deformed PC steel wires, deformed PC steel wire strands, continuous fiber reinforcing members and the like used for pre-stressed concrete or ground anchors).

Steel frames, reinforcing bars, steel pipes, anchor bolts, lock bolts, tendon/tension members, and the like have a part covered with the concrete, ground or the like, piping has a part covered with the heat insulation material or the like, and shafts of instruments have a part covered with the casing, cover or the like, for example. It is difficult to visually inspect appearances of the members in such parts.

Steel frames, steel bars, steel pipes and piping, however, are prone to degradation such as deformation, corrosion, cracks and facture as well as accompanying decrease in mechanical strength.

Similarly, shafts of instruments are also prone to degradation such as deformation, wear, corrosion, cracks and fracture at a sliding part.

As regards anchor bolts, in addition to the changes in the form of members themselves as mentioned above, there is a possibility of inappropriate installation and degradation resulting from, for example, insufficient filling of adhesive resin, insufficient stirring of adhesive resin, degradation/peeling of adhesive resin, contamination of foreign material, inadequate cleaning of the hole, loosening of a bolt, insufficient fastening, loosening, slipping of a nut, insufficient strength/cracks/decrease in strength of surrounding concrete and so on. As a consequence, there is a possibility of decrease in fixing strength/pull out strength.

Similarly, lock bolts and tendon/tension members may also be prone to inappropriate installation and degradation mentioned above and, in addition, prone to degradation resulting from inappropriate installation caused by insufficient filling of grout, variation in tensile force, change in strength of the ground, and so on.

When such inappropriate installation or degradation is left unattended, it may lead to safety problems of the structure or the instrument. Therefore, it is very important to inspect and evaluate the state of a member arranged at a portion where visual inspection is difficult in a structure or an instrument, in order to ensure safety of the structure or the instrument.

In view of the foregoing, conventionally, as methods of inspecting and evaluating states of members arranged at portions where visual inspection is difficult, hammering test method, ultrasonic test method and X-ray test method have been adopted.

According to the hammering test method, a member is hit by a hammer, and based on two factors, that is, the sound generated by the hammer at that time and the hit feeling through the hammer, an inspector determines presence/absence of any abnormality. Quantitative determination as to the presence/absence of any abnormality by the hammering test method largely depends on the skill of the inspector. Further, depending on the environment of inspection (such as noise environment and the status of installation), the test itself becomes difficult.

According to the ultrasonic test method, an ultrasonic sensor is mounted on an exposed part of a member and any defect of the member such as corrosion, a scratch or the like of an anchor bolt is determined from a received signal, and this method has been widely used as a method of non-destructive inspection. For inspection by this method, however, it is necessary to consider smoothness of a surface portion where the ultrasonic sensor is in contact, and this method is inapplicable to a member having a complicated shape.

The X-ray test method allows quantitative measurement in accordance with shape variations. This method, however, poses problems such as time for measurements, scale of the testing apparatus, and various restrictions associated with use of radiation.

As described above, the conventional hammering test method, ultrasonic test method and X-ray test method have various problems and restrictions. Under the circumstances, a method of diagnosing corrosion thinning of an anchor bolt has been proposed in Patent Document 1.

In short, this method can be summarized to have the following two characteristic points, and in both points, this method still has problems.

First, a sample, which is an anchor bolt as an object of inspection, is vibrated by a hammer or the like, and eigenfrequency of the sample is measured using a sound collector microphone, an acceleration pick-up or the like. Here, other than the sound of the sample itself generated when it is vibrated, external noise or vibration is also collected and, therefore, accurate evaluation is difficult. Therefore, as in the case of conventional hammering test method, test itself becomes difficult depending on the environment of testing (such as noise environment and the status of installation) or the like.

Next, the amount of corrosion thinning of the sample is determined based on the theory of bending vibration of beam that eigenfrequency decreases as the corrosion thinning of the sample proceeds. In this method, however, the change in eigenfrequency is calculated and evaluated focusing only on uniform thinning. Therefore, if there should be non-uniform degradation such as corrosion on one side only, or there is inappropriate installation, the evaluation could be incorrect. Specifically, if there is uneven degradation or inappropriate installation, depending on the direction of applied vibration, the eigenfrequency does not necessarily change to the lower frequency side and, therefore, occurrence of uneven degradation or inappropriate installation would not be detected. This makes accurate evaluation difficult. Further, the test also has restrictions, such as the necessity of removing a nut.

Such problems are encountered not only by the various members mentioned above but also by the concrete itself (concrete member) as a foundation for installing such members.

PRIOR ART DOCUMENT

Patent Document

Patent Document 1: JP-A-2004-325224

SUMMARY OF THE INVENTION

Problems to be Solved by the Invention

In view of the above-described problems of the methods of evaluating a state of a member including inappropriate installation and degradation and associated decrease in mechanical strength, fixing strength and pull-out strength, an object of the present invention is to provide a method of evaluating a state of a member for grasping various states of a member instantaneously with higher accuracy, regardless of the shape of the member as an object of inspection, the environment of inspection and the inspector's skill.

Means for Solving the Problems

According to claim 1, the present invention provides
a method for evaluating state of member for quantitatively evaluating a state of a member in a non-destructive manner, based on an acoustic signal generated by vibration applied to the member as an object of inspection, comprising
an analysis model forming step of modeling each of members in sound and un-sound states and forming analysis models;
a state evaluation database building step of determining a plurality of vibration applying points and measuring points on each of the analysis models, applying vibration from each of the plurality of the vibration applying points, measuring acoustic signals generated by said applied vibration at each of the plurality of the measuring points and performing frequency analysis, thereby obtaining data of frequency distribution including eigenfrequency of each of a plurality of modes provided at each of the vibration applying points and the measuring points as state evaluation data and building the state evaluation database;
an actually measured state evaluation data obtaining step of applying vibration from each of the plurality of vibration applying points of said member as the object of inspection, measuring acoustic signals generated by said applied vibration at each of the plurality of measuring points and performing frequency analysis, thereby obtaining data of frequency distribution including eigenfrequency of each of the plurality of modes as the actually measured state evaluation data; and
a state evaluating step of comparing said obtained actually measured state evaluation data with each state evaluation data of said state evaluation database, and thereby evaluating the state of said member as the object of inspection.

The invention according to claim 2 is the method for evaluating state of member according to claim 1, wherein
said analysis model is an analysis model formed for numerical analysis; and
at said state evaluation database building step, said state evaluation data is obtained by using a numerical analysis method for said analysis model.

The invention according to claim 3 is the method for evaluating state of member according to claim 2, wherein
said analysis model is modeled by adding a fixing condition for fixing the member as said object of inspection.

The invention according to claim 4 is the method for evaluating state of member according to claim 2, wherein
said numerical analysis method is a numerical analysis method selected from the group consisting of finite element method, finite difference method, finite volume method and boundary element method.

The invention according to claim 5 is the method for evaluating state of member according to any one of claims 2 to 4, wherein
said frequency analysis at said state evaluation database building step is time history response analysis or frequency response analysis.

The invention according to claim 6 is the method for evaluating state of member according to claim 5, wherein
at said state evaluation database building step, before executing said time history response analysis or said frequency response analysis, eigenvalue analysis is executed, and said time history response analysis or said frequency response analysis is executed based on the result of said eigenvalue analysis.

The invention according to claim 7 is the method for evaluating state of member according to claim 1, wherein
said analysis model is a mock-up sample formed simulating an actual state of use; and
at said state evaluation database building step, said state evaluation data is obtained by measuring an acoustic signal generated by applying vibration to said mock-up sample.

The invention according to claim 8 is the method for evaluating state of member according to claim 7, wherein
said analysis model is modeled by adding a fixing condition for fixing the member as said object of inspection.

The invention according to claim 9 is the method for evaluating state of member according to any one of claims 1 to 8, wherein said member as said object of inspection is a pipe, a bar, a board, a wire, a chain formed by metal, ceramics or resin, or a combination thereof, arranged at a portion where visual inspection is difficult.

The invention according to claim 10 is the method for evaluating state of member according to any one of claims 1 to 8, wherein said member as said object of inspection is a concrete member installed at a portion where visual inspection is difficult.

The invention according to claim 11 is the method for evaluating state of member according to any one of claims 1 to 10, wherein, at said actually measured state evaluation data obtaining step, a sensor, that can be brought into direct contact with the member as an object of inspection, is used as an equipment for measuring acoustic signals generated by said applied vibration.

The invention according to claim 12 is the method for evaluating state of member according to claim 11, wherein an acoustic emission sensor is used as said sensor.

Effect of the Invention

According to the present invention, is provided a method for evaluating state of member capable of grasping various states of a member instantaneously with higher accuracy, regardless of the shape of the member as an object of inspection, the environment of inspection and the inspector's skill.

BRIEF DESCRIPTION OF THE DRAWINGS

FIG. 1 A view showing analysis models modeling corrosion thinning used for the member state evaluation method in accordance with an embodiment of the present invention.

FIG. 2 A view showing correspondence between modes of analysis models modeling corrosion thinning used for the member state evaluation method in accordance with an embodiment of the present invention and the deformed shapes.

FIG. 3 A view showing the sensor mounting position and the vibration applying point of the analysis model sample No. 2 shown in FIG. 1, used for the member state evaluation method in accordance with the present embodiment.

FIG. 4 A view showing the results of frequency response analysis for analysis models used for the member state evaluation method in accordance with an embodiment of the present invention.

FIG. 5 A view explaining multi-point measurement in the member state evaluation method in accordance with an embodiment of the present invention.

FIG. 6 A view showing data of frequency distribution obtained in the member state evaluation method in accordance with an embodiment of the present invention.

FIG. 7 A view showing analysis models modeling steel pipes for Evaluation Experiment 1.

FIG. 8 A view showing data of frequency distribution obtained in Evaluation Experiment 1.

FIG. 9 A view showing analysis models modeling lock bolts for Evaluation Experiment 2.

FIG. 10 A view showing data of frequency distribution obtained in Evaluation Experiment 2.

FIG. 11 A view showing an analysis model modeling a ground anchor for Evaluation Experiment 3.

FIG. 12 A view showing data of frequency distribution obtained in Evaluation Experiment 3.

FIG. 13 A view showing relation between the tensile strength of ground anchor and peak frequency in Evaluation Experiment 3.

FIG. 14 A view for explaining sound concrete block samples used in Evaluation Experiment 4.

FIG. 15 A view for explaining a simulated concrete block sample with reinforcing bar used in Evaluation Experiment 4.

FIG. 16 A view for explaining a simulated concrete block sample with void used in Evaluation Experiment 4.

FIG. 17 A view for explaining a simulated concrete block sample with crack/peeling used in Evaluation Experiment 4.

FIG. 18 A view for explaining the test in Evaluation Experiment 4.

FIG. 19 A view for explaining the test results in Evaluation Experiment 4.

EMBODIMENTS OF THE INVENTION

The present invention will be described below based on an embodiment of the invention with reference to the drawings.

1. Overview of the Method for Evaluating Member State in Accordance with an Embodiment of the Present Invention First, the overview of the method for evaluating member state in accordance with this embodiment is explained.

The method for evaluating member state in accordance with this embodiment is similar to the above-mentioned method for evaluating member state described in Patent Document 1 in that vibration is applied by a hammer or the like to a member as the object of inspection and the state of the member is evaluated based on an acoustic signal generated by the applied vibration.

The method for evaluating member state in accordance with this embodiment, however, is different from the method described in Patent Document 1 in that it includes:

the state evaluation database building step of applying vibration from a plurality of vibration applying points, measuring acoustic signals generated by said applied vibration at a plurality of measuring points and performing frequency analysis, thereby obtaining data of frequency distribution including eigenfrequency of each of a plurality of modes provided at each of the vibration applying points and the measuring points as state evaluation data and building the state evaluation database;

the actually measured state evaluation data obtaining step of applying vibration to said member as the object of inspection, performing frequency analysis of the generated acoustic signal, and thereby obtaining data of frequency distribution including eigenfrequency of each of the plurality of modes obtained at each of the vibration applying points and the measuring points as the actually measured state evaluation data; and the state evaluating step of comparing said obtained actually measured state evaluation data with each state evaluation data of said state evaluation database, and thereby evaluating the state of said member as the object of inspection.

2. Steps in the Method for Evaluating Member State in Accordance with this Embodiment Next, steps in the method for evaluating member state in accordance with this embodiment will be explained.

(1) State Evaluation Database Building Step

This is a step of building in advance a state evaluation database storing state evaluation data as the object of comparison when the state of a member as the object of inspection is to be evaluated.

First, the same members as the member to be inspected are prepared as analysis models. Specifically, analysis models for finite element method, as analysis models for numerical analysis, are prepared, in which members in a sound state (normal member) and members in unsound states (members suffering from inappropriate installation, degradation and the like) are each modeled.

Here, as analysis models, it is possible to use analysis models obtained by appropriately changing the shapes, physical properties or conditions for fixing the member as the object of inspection (for example, insufficient filling of resin may be reflected by modeling with the length of resin made shorter). By using such analysis models having factors other than the member itself, it becomes possible to evaluate the state of the member without necessitating removal of the member from the structure in which it is used and, as a result, the time necessary for evaluating the state can significantly be reduced.

Next, using the finite element method, each analysis model is subjected to eigenvalue analysis.

Thereafter, similarly using the finite element method on each analysis model, frequency analysis is performed based on the results of eigenvalue analysis, whereby data of frequency analysis including eigenfrequency of each of the plurality of modes obtained from each vibration applying point and each measuring point are obtained as the state evaluation data. Thus, the state evaluation database is built.

Specifically, first, a plurality of vibration applying points and measuring points (sensor mounting position) are determined on an analysis model.

Thereafter, a vibration applying force simulating a hit by a hammer is input to each vibration applying point provided on the analysis model, vibration (for example, displacement, velocity, acceleration etc.) at each measuring point is calculated, and thus, data of frequency distribution including eigenfrequencies of a plurality of modes obtained for each vibration applying point and each measuring point are collected.

Here, frequency response analysis (mode method) is conducted, in which a simple sinusoidal wave is input as the vibration applying force, and corresponding steady response is analyzed for a certain frequency range.

If it is desired to obtain accurate changes in signals detected by the sensor, it is possible to input a vibration applying force simulating hitting, and to conduct time history response analysis (transit response analysis). In that case, more accurate frequency distribution can be obtained.

Data of frequency distribution including eigenfrequencies of a plurality of modes obtained from each vibration applying point and each measuring point of each analysis model are collected, and the data of frequency distribution are obtained as the state evaluation data, and the state evaluation database is built.

It is also possible to perform time history response analysis or frequency response analysis on each analysis model by appropriately applying overall attenuation, material attenuation, attenuation factor or the like without using the eigenvalue analysis, and to obtain the frequency distribution data including eigenfrequencies of each of the plurality of modes.

(2) Actually Measured State Evaluation Data Obtaining Step

This is a step of obtaining actually measured state evaluation data of the actual object of inspection.

First, at a portion as a measuring point of the member as the object of inspection, a sensor is mounted.

Next, the member as the object of inspection is hit, for example, by a hammer to apply vibration, and acoustic signals generated by the applied vibration is obtained by the sensor.

Next, the obtained acoustic signals are subjected to frequency analysis, and data of frequency distribution including eigenfrequencies of a plurality of modes obtained from each vibration applying point and each measuring point are obtained as the actually measured state evaluation data. Here, use of Fast Fourier Transform for the frequency analysis expedites processing.

As the sensor, it is preferred to use a sensor that can be brought into direct contact with the member to be inspected, such as an acoustic emission (AE) sensor. By bringing the sensor in direct contact with the member as the object of inspection, it becomes possible to obtain the acoustic signal excited by the hitting coming from the member itself to be inspected. Therefore, the problem of the conventional hammering test method and the method of Patent Document 1 that the test itself becomes difficult depending on the environment of testing (such as noise environment and the status of installation) can be alleviated, and resistance to disturbance such as external noise can be improved. This leads to evaluation with higher accuracy. In place of AE sensor, a displacement sensor or an acceleration sensor may be used.

(3) State Evaluating Step

The actually measured state evaluation data (data of frequency distribution) obtained at the actually measured state evaluation data obtaining step are compared with each state evaluation data (data of frequency distribution) of the state evaluation database built in advance at the state evaluation database building step. Thus, it is possible to find which state evaluation data in the state evaluation database correspond to the actually measured state evaluation data. Therefore, even if the member as the object of inspection is arranged at a position where visual inspection is difficult, it is possible to instantaneously grasp the state (whether it is in a normal state, inappropriately installed, degraded or the like) of the member as the object of inspection and to quantitatively evaluate the state.

As the member arranged at a position where visual inspection is difficult, pipes, bars, boards, wires, chains or the like formed by metal, ceramics or resin, or combinations thereof, specifically, steel frames, reinforcing bars, steel pipes, piping, shafts of instruments (such as pumps and cars), anchor bolts, lock bolts, tendon/tension members can be cited.

As described above, according to this embodiment, the state evaluation database is built in advance by obtaining, as state evaluation data, data of frequency distribution including eigenfrequencies of each of the plurality of modes obtained for each vibration applying point and each measuring point based on detailed frequency response analysis or time history response analysis, rather than a single eigenfrequency, and each state evaluation data in the state evaluation database is compared with the frequency distribution including eigenfrequencies of the plurality of modes obtained for each vibration applying point and each measuring point of the member as the object of inspection, for making an evaluation.

As a result, states such as uneven, inappropriate installation and degradation can be evaluated with far higher accuracy as compared with the methods in Patent Document 1. Specifically, according to Patent Document 1, state evaluation is done using single eigenfrequency based on the theory of beam bending frequency. In this method, however, vibration mode that is easily excited varies depending on the position of vibration applying point, and vibration mode that can be evaluated differs depending on the position where the sensor is mounted. Therefore, it has been unclear the eigenfrequency of which mode has been picked-up. This possibly results in erroneous determination and makes highly accurate evaluation difficult.

It is noted that while the state evaluation database is built using finite element method at the state evaluation database building step in this embodiment, the state evaluation database may be built using other numerical analysis method such as finite difference method, finite volume method or boundary element method.

Further, in the foregoing, an analysis model prepared for numerical analysis is used and a numerical analysis method is applied to the analysis model to obtain state evaluation data. As the analysis model, however, a mock-up sample formed by simulating actual state of use may be used, and the state evaluation data may be obtained by measuring acoustic signals generated by actually applying vibration thereto.

The method of evaluating state of a member in accordance with this embodiment is applicable not only to such members as mentioned above but also to a concrete member as a foundation for installing such members. Hence, it is possible to similarly evaluate a state of concrete member installed at a portion where visual inspection is difficult.

3. Specific Evaluation Using the Method for Evaluating State of Member of this Embodiment In the following, as a specific example of the use of the method for evaluating state of member in accordance with this embodiment, evaluation of a state of a member that has corrosion thinning will be described in detail. Here, frequency response analysis (mode method) using finite element method was adopted as the numerical analysis method.

(1) Eigenvalue Analysis

FIG. 1 shows analysis models modeling corrosion thinning used for the method for evaluating state of member in accordance with this embodiment.

First, members having portions of reduced thickness 2 resulting from corrosion thinning such as shown as Nos. 1 to 3 of FIG. 1 were formed as analysis models (samples). Before conducting frequency response analysis (mode method) on these analysis models, eigenvalue analysis was conducted.

Table 1 shows results of mode-by-mode eigenvalue analysis for the analysis models modeling corrosion thinning. The modes in Table 1 correspond to the deformed shapes shown in FIG. 2.

TABLE 1

| Deformation Modes | No. 1 | No. 2 | No. 3 |
|---|---|---|---|
| Mode 1 | 1055.66 | 952.95 | 991.55 |
| Mode 1' | 1055.81 | 1040.22 | 991.69 |
| Mode 2 | 2744.83 | 2503.06 | 2610.96 |
| Mode 2' | 2745.16 | 2727.47 | 2611.30 |
| Mode 3 | 3177.22 | 3009.00 | 2987.38 |
| Mode 4 | 5006.81 | 4830.63 | 4944.87 |
| Mode 4' | 5007.35 | 4928.55 | 4945.38 |
| Mode 5 | 5109.37 | 5024.85 | 4980.62 |
| Mode 6 | 6354.45 | 6090.35 | 6066.15 |
| Mode 7 | 7642.47 | 7441.36 | 7537.77 |
| Mode 7' | 7643.20 | 7594.52 | 7538.50 |
| Mode 8 | 9531.68 | 9687.15 | 9971.84 |
| Mode 9 | 10193.30 | 9737.49 | 10011.09 |
| Mode 10 | 10516.66 | 10491.79 | 10391.46 |
| Mode 10' | 10517.53 | 10620.06 | 10392.40 |

The examples shown above have no condition for fixing. When eigenvalue analysis is to be performed on a member (such as steel frames, reinforcing bars, steel pipes, piping, anchor bolts, lock bolts, tendon/tension members or shafts of instruments) in an actually installed state, in addition to analysis models of the member itself to be inspected, analysis models are prepared in consideration of other factors (such as concrete, grouts, resin, nut, or ground), on which eigenvalue analysis is performed. As regards inappropriate installation or degradation, models are formed with conditions for fixing, physical values, shapes and the like appropriately modified corresponding to such states. As a specific example, for insufficient filling of resin, a model with the resin dimension made shorter is prepared.

(2) Building of State Evaluation Database (a) Determination of Vibration Applying Points and Measuring Point FIG. 3 shows vibration applying points and a measuring point of the analysis model sample No. 2 shown in FIG. 1, used for the method for evaluating state member on in accordance with this embodiment.

As shown in FIG. 3, the vibration applying point on analysis model sample No. 2 was determined to be a position 10 mm from the upper end. Regarding the vibration applying point, the analysis model of sample No. 2 is a corrosion thinning model with thickness of one side reduced by corrosion and, therefore, excited vibration mode differs depending on the vibration applying point. Therefore, analysis was performed at three points, that is, a surface where the thickness is reduced (0°), a surface opposite to the surface with the thickness reduced (180°), and a middle surface (90°) inbetween, with the portion of reduced thickness considered to be 0°. The measuring point was selected to be the same position as where a sensor 3 (AE sensor) was to be mounted.

(b) Numerical Analysis of Vibration at Measuring Point

Based on the measured values, velocity component in the axial direction at the center of upper surface of the sample was found by numerical calculation.

In simulating hammer hitting, in this embodiment, of the obtained frequency components, only the frequency components of respective modes of about 0 to about 12 kHz were focused. Therefore, based on the results of eigenvalue analysis described above, using the frequency response analysis (mode method), analysis was performed with the vibration frequency varied from about 0 to about 12 kHz. As for remaining corrosion thinning models (Nos. 1 and 3), analysis was performed on the same three points as described above. FIG. 4 shows the results.

In order to evaluate frequency components and its intensity to obtain accurate information, vibration applying force simulating hitting is input, and time history response analysis is performed based on the above-described results of eigenvalue analysis.

Further, by expanding the state evaluation database to prepare state evaluation database with measuring points varied, it becomes possible to diagnose with the measuring points changed variously, or to simultaneously measure at a plurality of measuring points (multi-point measurements). Actually, by setting a plurality of measuring points, it becomes easier to capture acoustic variation derived from the change of state of member 4 as the object of inspection and, therefore, it becomes easier to specify the state of member 4 as the object of inspection.

(3) State Evaluation (Actually Measured State Evaluation Data Obtaining Step and State Evaluation Step)

(a) Mounting of Sensor

First, an AE sensor was mounted on the position shown in FIG. 3 on each of the objects of inspection formed to have the shapes of Nos. 1 to 3. When a displacement sensor or an acceleration sensor is used as the sensor, physical amount detected by the sensor is numerically calculated.

(b) Application of Vibration by a Hammer or the Like, Acoustic Measurement of Members as the Object of Measurement The vibration application points shown in FIG. 3 of each object of inspection were hit by a hammer, and acoustic signals were measured.

(c) Obtaining Frequency Distribution of Acoustic Sound

The obtained acoustic signals were subjected to Fast Fourier Transform to obtain data of frequency distribution (actually measured state evaluation data). FIG. 6 shows the obtained data of frequency distribution.

(d) State Evaluation

From the state evaluation database built in advance, data matching with the obtained data of frequency distribution were extracted, and the states of objects for inspection were quantitatively evaluated.

First, regarding the data of frequency distribution of a normal sample (analysis model No. 1), in the frequency peaks observed in the results of normal sample shown in FIG. 4, the peaks at 2-3 kHz, 5 kHz, 8 kHz and 10 kHz match, and the data is constant even when the vibration application points were changed in the circumferential direction. Therefore, it can be determined to be normal.

Next, consider the data of frequency distribution of a one-side corroded sample (analysis model No. 2). As in the frequency distribution data observed in the results of one-side corroded sample shown in FIG. 4, two peaks can be seen around 5 kHz and 10 kHz, the peak position is similar to that of the frequency distribution data of the normal sample at the vibration applying point of 90°, while at vibration applying points of 0° and 180°, the peaks are shifted to the lower frequency side than the frequency peaks of the normal sample. From these observations, it can be determined that one side of the sample is corroded Finally, regarding the data of frequency distribution of a circumferentially corroded sample (analysis model No. 3), as can be seen in the results of circumferentially corroded sample shown in FIG. 4, the peaks at 2-3 kHz, 5 kHz and 8 kHz are shifted to the lower frequency side as compared with the normal one, and the data is constant even when the vibration was applied from different points in the circumferential direction. From these observations, it can be determined that the circumferential thickness of the sample is reduced.

As described above, by comparing the data of frequency distribution including eigenfrequencies of a plurality of modes obtained for each of a plurality of hitting points (or a plurality of measuring points) of the object of inspection with the state evaluation database storing the data of frequency distribution including eigenfrequencies of a plurality of modes obtained for each of a plurality of hitting points (or a plurality of measuring points), the state can be determined with higher accuracy.

4. Evaluation Experiments

In the following, examples of evaluation experiments of steel pipes (Evaluation Experiment 1), steel pipe expansion type lock bolts (Evaluation Experiment 2) and a ground anchor (Evaluation Experiment 3) will be described, so as to illustrate the usefulness of the present invention. The states of various members were evaluated in the same manner as described above.

(Evaluation Experiment 1)

As Evaluation Experiment 1, states of steel pipes were evaluated.

(1) Eigenvalue Analysis

FIG. 7 shows analysis models of Evaluation Experiment 1. As shown in FIG. 7, in Evaluation Experiment 1, analysis models of four different types of steel pipes were formed, namely, a steel pipe in the normal, sound state (No. 1, normal) and three types of steel pipes in unsound states, that is, a steel pipe with a crack (No. 2, cracked sample), a steel pipe corroded circumferentially (No. 3, circumferentially corroded sample), and a steel pipe having a through hole of corrosion (No. 4, through-hole corroded sample). Before conducting the frequency response analysis (mode method) on these analysis models, first, eigenvalue analysis was conducted to find mode-by-mode eigenfrequencies.

(2) Building of State Evaluation Database (a) Determination of Vibration Applying Points and Measuring Points The vibration applying point was determined to be a position 10 mm from the upper end of steel pipe.

Regarding the vibration applying point, Samples No. 2 and No. 4 are direction-dependent samples, and excited vibration mode differs depending on the position of vibration applying point. Therefore, in Sample No. 2, the portion of crack (front side in the figure) and in Sample No. 4, the portion of through hole degradation (front side in the figure), are set as the point of 0°, and vibration was applied at three points, i. e., the degraded surface (0°), the surface opposite to the degraded surface (180°) and the intermediate surface) (90°).

The measuring point was set to be the upper end surface.

(b) Numerical Analysis of Vibration at Measuring Point

Velocity component in the axial direction at the center of upper surface of each sample was calculated based on the measurements.

(3) State Evaluation (Actual State Evaluation Data Obtaining Step and State Evaluation Step)

(a) Mounting of Sensors

First, AE sensors were mounted on the upper end surface of the objects of inspection formed to the shapes of Nos. 1 to 4.

(b) Application of Vibration by a Hammer or the like, Acoustic Measurements of Members as Objects of Measurement Each object of inspection was hit at the above-described vibration application points by a hammer, and acoustic signals were measured.

(c) Obtaining Acoustic Frequency Distribution

Data of frequency distribution (actual state evaluation data) were obtained from the measured acoustic signals. FIG. 8 shows the thus obtained data of frequency distribution.

(d) State Evaluation

From the state evaluation database built in advance, data matching with the obtained frequency distribution data were extracted, and the state of the member as the object of inspection was quantitatively evaluated.

First, by the comparison with the state evaluation database, frequencies around 4 kHz, 6 kHz and 7 kHz were used as evaluation points, and it was found that significant differences were detected. As to Sample No. 2 and Sample No. 4, it can be seen that the difference in peaks in circumferential direction could be detected.

(Evaluation Experiment 2)

As Evaluation Experiment 2, states of lock bolts were evaluated.

(1) Eigenvalue Analysis

FIG. 9 shows analysis models of Evaluation Experiment 2. As shown in FIG. 9, in Evaluation Experiment 2, analysis models of three different types of lock bolts were formed, namely, a lock bolt in the normal, sound state (No. 1, normal) and two types of lock bolts in unsound states, that is, a lock bolt with a crack (No. 2, cracked sample), and a lock bolt with a bending deformation (No. 3, bending deformed sample). Before conducting the frequency response analysis (mode method) on these analysis models, first, eigenvalue analysis was conducted to find mode-by-mode eigenfrequencies.

(2) Building of State Evaluation Database (a) Determination of Vibration Applying Points and Measuring Points The vibration applying point was determined to be a position 5 mm from the upper end of lock bolt.

Regarding the vibration applying point, Samples No. 2 and No. 3 are direction-dependent samples, and excited vibration mode differs depending on the position of vibration applying point. Therefore, in Sample No. 2, the portion of crack (front side in the figure) and in Sample No. 3, the portion of bending deformation (front side in the figure), are set as the point of 0°, and vibration was applied at three points, i. e., the degraded surface (0°), the surface opposite to the degraded surface (180°) and the intermediate surface) (90°).

The measuring point was set to be the upper end surface (Upper sleeve end face in FIG. 9).
(b) Numerical Analysis of Vibration at Measuring Point Velocity component in the axial direction at the center of upper surface of each sample was calculated based on the measurements.

(3) State Evaluation (Actual State Evaluation Data Obtaining Step and State Evaluation Step)
(a) Mounting of Sensors First, AE sensors were mounted on the upper end surface of the objects of inspection formed to the shapes of Nos. 1 to 3.

(b) Application of Vibration by a Hammer or the like, Acoustic Measurements of Members as Objects of Measurement Each object of inspection was hit at the above-described vibration application points by a hammer, and acoustic signals were measured.

(c) Obtaining Acoustic Frequency Distribution

Data of frequency distribution (actual state evaluation data) were obtained from the measured acoustic signals. FIG. 10 shows the thus obtained data of frequency distribution.

(d) State Evaluation

From the state evaluation database built in advance, data matching with the obtained frequency distribution data were extracted, and the state of the member as the object of inspection was quantitatively evaluated.

First, by the comparison with the state evaluation database, frequency peaks around 3.4 kHz, 3.6 kHz, 3.9 kHz and 4.6 kHz were used as evaluation points for the hit points of 0° and 180° and frequency peaks around 3.3 kHz, 3.5 kHz, 3.8 kHz and 4.0 kHz were used as evaluation points for the hit point of 90°, and it was found that significant differences were detected among the members as the object of inspection. As to Sample No. 2 and Sample No. 3, it can be seen that the difference in peaks in circumferential direction could be detected.

(Evaluation Experiment 3)

As Evaluation Experiment 3, states of a ground anchor were evaluated.

(1) Eigenvalue Analysis

FIG. 11 shows analysis models of Evaluation Experiment 3. As shown in FIG. 11, in Evaluation Experiment 3, analysis models of a ground anchor were formed in which the tension was changed by a weight hanged from the ground anchor. Before conducting the frequency response analysis (mode method) on these analysis models, first, eigenvalue analysis was conducted to find mode-by-mode eigenfrequencies.

(2) Building of State Evaluation Database
(a) Determination of Vibration Applying Points and Measuring Points In this Evaluation Experiment 3, as the combination of vibration applying point and measuring point, a combination in which both of vibration applying point and measuring point are on side of the bolt and a combination in which both of vibration applying point and measuring point are on top of the bolt are adopted.

(b) Numerical Analysis of Vibration at Measuring Point

Velocity component in the axial direction at the center of upper surface of each sample was calculated based on the measurements.

(3) State Evaluation (Actual State Evaluation Data Obtaining Step and State Evaluation Step)
(a) Mounting of Sensors First, AE sensors were mounted on each of the above-described measuring points of the objects of inspection formed to the shapes of FIG. 11.

(b) Application of Vibration by a Hammer or the like, Acoustic Measurements of Members as Objects of Measurement Each object of inspection was hit at the above-described vibration application points by a hammer, and acoustic signals were measured at the above-described measuring points.

(c) Obtaining Acoustic Frequency Distribution

Data of frequency distribution (actual state evaluation data) were obtained from the measured acoustic signals. FIG. 12 shows the thus obtained data of frequency distribution.

(d) State Evaluation

From the state evaluation database built in advance, data matching with the obtained frequency distribution data were extracted, and the state of the member as the object of inspection was quantitatively evaluated.

When the vibration applying point and measuring point are on side of the bolt, by the comparison with the data, a frequency peak around 1 kHz was used as the evaluation point, and when the vibration applying point and measuring point are on top of the bolt, by the comparison with the data, a frequency peak around 3.6 kHz was used as the evaluation point.

As a result, it is shown that as weight applied on the ground anchor increases, i.e. the tension increases, each of the frequency peaks is shifted to the higher frequency side and the state can be evaluated quantitatively.

After confirming the results at the evaluation points, it is preferred to make graph with frequency for the evaluation points on the vertical axis and weight applied on the ground anchor on the horizontal axis as shown in FIG. 13. It is understand that it becomes easy to confirm the quantitative change with the change in tension from the graph.

(Evaluation Experiment 4)

As Evaluation Experiment 4, state of concrete itself, as a foundation when each of the above-described members is to be installed, was evaluated.

(1) Formation of Samples

First, as sound concrete block samples 6a, three concrete block samples of 200×200×200 (mm) were formed as shown in FIG. 14.

Next, as a sample simulating a state having a reinforcing bar embedded therein, one concrete block sample of the same size (simulated concrete block sample with reinforcing bar 6b) was formed as shown in FIG. 15. In FIG. 15, number 7 indicates reinforcing bar.

Next, as a sample simulating formation of a void, one concrete block sample of the same size (simulated concrete block sample with void 6c) as shown in FIG. 16 was formed. In FIG. 16, number 8 indicates void.

Next, as a sample simulating generation of crack/peeling, one concrete block sample of the same size (simulated concrete block sample with crack/peeling 6d) as shown in FIG. 17 was formed. In FIG. 17, number 9 indicates the portion of crack/peeling.

(2) Frequency Analysis

An AE sensor as the sensor 3 was mounted on the upper surface of each of the formed concrete block samples 6 as shown in FIG. 18, and the prescribed vibration application point near the sensor 3 was hit by a hammer 5. Acoustic signals generated by the hitting were obtained by the sensor 3. Thereafter, the obtained acoustic signals were subjected to Fast Fourier Transform (FFT analysis), whereby data of frequency distribution were obtained. The results are shown in FIG. 19.

As shown in FIG. 19, sound concrete block samples all exhibited generally the same frequency distributions, while the concrete block sample with reinforcing bar, the concrete block sample with void and the concrete block sample with crack/peeling exhibited frequency distributions sufficiently different to distinguish from each other.

This shows that by focusing on the frequency distribution, the state of concrete itself can also be grasped. Thus, it is understood that if state evaluation database is prepared from frequency distributions of larger number of simulated concrete block samples, quantitative state evaluation becomes possible.

5. Effects of the Embodiment

As described above, by modeling inappropriate installation, degradation and the like of members as the object of inspection and by forming state evaluation database storing data of frequency distribution including the eigenfrequencies of a plurality of modes obtained for each vibration application point and each measuring point by adopting the present embodiment that focuses on the frequency distribution including eigenfrequencies of a plurality of modes of obtained signals, it becomes possible to reduce the possibility of erroneous determination experienced when evaluation is done focusing only on the eigenfrequency of single mode, which leads to evaluation of frequency that does not change even when there is degradation. Thus, state diagnosis with higher accuracy is realized. Further, accurate diagnosis of uneven degradation and inappropriate installation becomes possible, which has been difficult by conventional techniques.

Further, by incorporating factors other than the member as the object of inspection (nut, base plate, concrete, resin, ground and the like), for example, by preparing state evaluation database with a nut fastened, it becomes possible to diagnose the member in the nut-fastened state. Thus, the step of removing the nut, which has been indispensable in the conventional technique, can be omitted, and the time necessary for diagnosis can significantly be reduced.

As compared with the conventional technique by which only the positive or negative determination could be obtained as the result of diagnosis, the present embodiment enables accurate evaluation of state of degradation or inappropriate installation, since the data of frequency distribution including eigenfrequencies of a plurality of modes obtained for each vibration application point and each measuring point are obtained and compared with the state evaluation data base. Moreover, diagnosis of an uneven state (such as one-sided corrosion, crack, direction-dependent deformation, uneven peeling of resin, degradation, uneven filling of grout) also becomes possible.

Further, by preparing analysis models covering conditions for fixing, physical properties, shapes and the like of the member as the object of inspection as well as of other factors, it becomes possible, for example, to evaluate the state of the member without removing it from a structure where it is used.

The present invention has been described above with reference to the embodiments. However, the present invention is not limited to said embodiments. Various changes may be made on said embodiments within the scope identical or equivalent to that of the present invention.

DESCRIPTION OF THE REFERENCE NUMERALS

1 Analysis model
2 Reduced thickness
3 Sensor
4 Member as the object of inspection
5 Hammer
6 Concrete block sample
6a Sound concrete block sample
6b Simulated concrete block sample with reinforcing bar
6c Simulated concrete block sample with void
6d Simulated concrete block sample with crack/peeling
7 Reinforcing bar
8 Void
9 Position of crack/peeling

What is claimed is:

1. A method for evaluating a state of a member in a non-destructive manner, based on acoustic signals generated by vibration applied to the member, comprising:
   an analysis model forming step of physically forming mock-up samples that simulate an actual state of use of said member in a sound state and said member in a damaged state;
   determining a plurality of vibration applying points and measuring points on each of the mock-up samples;
   a state evaluation database building step of applying vibration at each of the plurality of the vibration applying points, measuring acoustic signals generated by said applied vibration at each of the plurality of the measuring points for each of the plurality of vibration applying points, performing frequency analysis to calculate a modelled frequency distribution including eigenfrequency for each of the plurality of measuring points and building the state evaluation database from the plurality of frequency distributions;
   an actually measured state evaluation data obtaining step of applying vibration at each of the plurality of vibration applying points of said member, measuring acoustic signals generated by said applied vibration at each of the plurality of vibration applying points at each of the plurality of measuring points and performing frequency analysis, thereby calculating a measured frequency distribution including eigenfrequency for each of the plurality of measuring points; and
   a state evaluating step of comparing said measured frequency distribution with each of the plurality of frequency distributions stored in said state evaluation database, and thereby evaluating the state of said member,
   wherein said member is a pipe, a bar, a board, a wire, a chain formed by metal, ceramics or resin, or a combination thereof, arranged at a portion where visual inspection is difficult.

2. The method for evaluating state of member according to claim 1, wherein,
   at said actually measured state evaluation data obtaining step, a sensor, that can be brought into direct contact with the member, is used as an equipment for measuring acoustic signals generated by said applied vibration.

3. The method for evaluating state of member according to claim 2, wherein an acoustic emission sensor is used as said sensor.

4. A method for evaluating a state of a member in a non-destructive manner, based on acoustic signals generated by vibration applied to the member, comprising:
- an analysis model forming step of physically forming mock-up samples that simulate an actual state of use of said member in a sound state and said member in a damaged state;
- determining a plurality of vibration applying points and measuring points on each of the mock-up samples;
- a state evaluation database building step of applying vibration at each of the plurality of the vibration applying points, measuring acoustic signals generated by said applied vibration at each of the plurality of the measuring points for each of the plurality of vibration applying points, performing frequency analysis to calculate a modelled frequency distribution including eigenfrequency for each of the plurality of measuring points and building the state evaluation database from the plurality of frequency distributions;
- an actually measured state evaluation data obtaining step of applying vibration at each of the plurality of vibration applying points of said member, measuring acoustic signals generated by said applied vibration at each of the plurality of vibration applying points at each of the plurality of measuring points and performing frequency analysis, thereby calculating a measured frequency distribution including eigenfrequency for each of the plurality of measuring points; and
- a state evaluating step of comparing said measured frequency distribution with each of the plurality of frequency distributions stored in said state evaluation database, and thereby evaluating the state of said member,
- wherein said member is a concrete member installed at a portion where visual inspection is difficult.

5. A method for evaluating a state of a member in a non-destructive manner, based on acoustic signals generated by vibration applied to the member, comprising:
- an analysis model forming step of physically forming mock-up samples that simulate an actual state of use of said member in a sound state and said member in a damaged state;
- determining a plurality of vibration applying points and measuring points on each of the mock-up samples;
- a state evaluation database building step of applying vibration at each of the plurality of the vibration applying points, measuring acoustic signals generated by said applied vibration at each of the plurality of the measuring points for each of the plurality of vibration applying points, performing frequency analysis to calculate a modelled frequency distribution including eigenfrequency for each of the plurality of measuring points and building the state evaluation database from the plurality of frequency distributions;
- an actually measured state evaluation data obtaining step of applying vibration at each of the plurality of vibration applying points of said member, measuring acoustic signals generated by said applied vibration at each of the plurality of vibration applying points at each of the plurality of measuring points and performing frequency analysis, thereby calculating a measured frequency distribution including eigenfrequency for each of the plurality of measuring points; and
- a state evaluating step of comparing said measured frequency distribution with each of the plurality of frequency distributions stored in said state evaluation database, and thereby evaluating the state of said member,
- wherein a fixing condition, including one of a shape, physical property or condition for setting the member is added to said mock-up sample.

* * * * *